United States Patent [19]

Nickols

[11] Patent Number: 4,609,595
[45] Date of Patent: Sep. 2, 1986

[54] MOLTEN CARBONATE FUEL CELL SEPARATOR

[75] Inventor: Richard C. Nickols, East Hartford, Conn.

[73] Assignee: The United States of America as represented by the United States Department of Energy, Washington, D.C.

[21] Appl. No.: 661,850

[22] Filed: Oct. 17, 1984

[51] Int. Cl.[4] ............................................. H01M 2/08
[52] U.S. Cl. ..................................... 429/35; 429/36; 429/37; 429/247
[58] Field of Search .......................... 429/247, 33–37; 220/67, 240

[56] References Cited

U.S. PATENT DOCUMENTS

| | | | |
|---|---|---|---|
| 3,253,953 | 5/1968 | Turner et al. | 429/37 X |
| 4,185,758 | 1/1980 | Giggard | 220/67 X |
| 4,206,270 | 6/1980 | Kunz et al. | 429/40 |
| 4,345,009 | 8/1982 | Fahle et al. | 429/37 |
| 4,402,397 | 9/1983 | Spence | 220/67 X |
| 4,431,714 | 2/1984 | Myerhoff | 429/37 X |
| 4,457,465 | 7/1985 | Shepard et al. | 220/67 X |
| 4,514,475 | 4/1985 | Mientek | 429/35 |

OTHER PUBLICATIONS

Vidt et al., "Evaluation of Gassification and Gas Cleanup Processes for Use in Molten Carbonate Fuel Cell Power Plants" Final Report, U.S. D.O.E. Contract DE-AC21-81MC16220, pp. 108-115.

"Development of Molten Carbonate Fuel Cell Power Plant Technology" Quarterly Report, U.S. D.O.E Contract DE-AC01-79ET15440, pp. 2-20.

Primary Examiner—Brian E. Hearn
Assistant Examiner—Stephen J. Kalafut
Attorney, Agent, or Firm—Hugh W. Glenn; Robert J. Fisher; Judson R. Hightower

[57] ABSTRACT

In a stacked array of molten carbonate fuel cells, a fuel cell separator is positioned between adjacent fuel cells to provide isolation as well as a conductive path therebetween. The center portion of the fuel cell separator includes a generally rectangular, flat, electrical conductor. Around the periphery of the flat portion of the separator are positioned a plurality of elongated resilient flanges which form a gas-tight seal around the edges of the fuel cell. With one elongated flange resiliently engaging a respective edge of the center portion of the separator, the sealing flanges, which are preferably comprised of a noncorrosive material such as an alloy of yttrium, iron, aluminum or chromium, form a tight-fitting wet seal for confining the corrosive elements of the fuel cell therein. This arrangement permits a good conductive material which may be highly subject to corrosion and dissolution to be used in combination with a corrosion-resistant material in the fuel cell separator of a molten carbonate fuel cell for improved fuel cell conductivity and a gas-tight wet seal.

12 Claims, 4 Drawing Figures

MOLTEN CARBONATE FUEL CELL SEPARATOR

CONTRACTUAL ORIGIN OF THE INVENTION

The United States Government has rights in this invention under Contract No. DE-AC01-79ET15440 between the U.S. Department of Energy and United Technologies Corporation.

CROSS-REFERENCE TO RELATED APPLICATIONS

This application is related to, but in no way dependent upon the following applications, both of which are assigned to the assignee of the present application: Ser. No. 595,012, filed Mar. 30, 1984, entitled "Fuel Cell Separator With Compressible Sealing Flanges", in the name of Anthony P. Mientek, and Ser. No. 614,505, filed May 29, 1984, entitled "Fuel Cell Separator Plate With Bellows-Type Sealing Flanges", in the name of George A. Louis.

BACKGROUND OF THE INVENTION

This invention relates generally to gaseous fuel cells and is particularly directed to an arrangement for electrically coupling and separating and sealing adjacent cells in a stocked array of molten carbonate fuel cells.

Gaseous fuel cells are comprised of an anode electrode spaced apart from a cathode electrode with an electrolyte disposed in the inter-electrode space. Each electrode includes a catalyst layer on the electrolyte side thereof. On the nonelectrolyte side of the anode electrode is circulated a fuel gas, while on the nonelectrolyte side of the cathode electrode is circulated an oxidant gas. The electrodes are constructed to permit a respective reactant gas to diffuse therethrough and to come in contact with the electrolyte and the catalyst layer thereby causing an electrochemical reaction wherein ions travel from one electrode to the other through the electrolyte and electrons travel from one electrode to the other via an external circuit.

In a fuel cell power plant a plurality of individual fuel cells are electrically coupled in series through conductive, gas impervious plates separating adjacent cells in forming a stacked array of fuel cells. These separator plates, in combination with the electrodes adjacent thereto, generally define the reactant gas passages which transit each fuel cell. The individual cells thus function as separate batteries coupled in series to provide an electrical output.

This type of energy source is referred to as a molten carbonate fuel cell because the electrolyte is in the form of a liquid at typical cell operating temperatures in the range of 550° C. to 750° C. The electrolyte is generally mixed so as to form a matrix with an inert particulate material which remains solid during cell operation to maintain spacing between the electrodes. These cells are thus characterized by high operating temperatures and highly corrosive internal elements.

The high temperatures and corrosive environment of molten carbonate fuel cells confront the fuel cell designer with difficult structural and fabrication problems. For example, changes in cell component thickness result from manufacturing tolerances or from characteristics exhibited by the cell components in response to operation of the cell. Thus, for example, at the high operating temperatures of the cell, the electrodes and electrode supports undergo thermal expansion, increasing the compressive forces thereon. Cell components undergo creep over time which tends to lessen the compressive forces and may cause cell components such as the separator plates to pull away from the cell and impair the sealing of the active cell areas. In addition, the thermal environment within the cell may substantially reduce the electrical and thermal conductivity between cell components and between adjacent cells resulting in low efficiency cell operation.

The first application referenced above discloses a fuel cell separator plate with compressive sealing rails each comprising a marginal flange of the separator plate folded back upon itself and cooperating with the plate to form a channel in which is inserted a stack of thin metal sheets. The thin metal sheets, each of which has a slight deviation from true flatness so as to afford a degree of compressibility, are bonded to one another, to the sealing flange, and to the plate in a laminated structure having the desired thickness. While this arrangement is capable of accommodating variations in the thickness of the associated fuel cell components due to creep, thermal expansion, etc., it requires a large number of components in a somewhat complicated fabrication process and thus is of limited commercial value. More specifically, the bending of the four edges of the separator plate back upon itself is not easily accomplished particularly where two of the edges are positioned on a first side of the separator plate and the other two edges are positioned on a second, opposite side of the separator plate.

The second application referenced above is directed to a fuel cell separator having a substantially flat, planar gas-impermeable plate, and a sealing flange unitary with the plate and comprising a peripheral margin of the plate folded back upon itself and including a first portion spaced from the plate and a second portion resiliently compressed in a direction generally normal to the plane of the plate so as to provide a "bellows-effect" for accommodating variation in the spacing between the first portion of the sealing flange and the plate. This approach, while providing an effective mechanical sealing arrangement for the fuel cell, involves the use of the same material in both the electrically active, inner portion of the separator plate as well as in the peripheral, sealing portion of the separator plate. Therefore, the designer must choose between a good conductor and a highly corrosion-resistant material for use in the fuel cell separator. This choice, due to limitations in the materials currently available, results in limited cell efficiency and only moderately effective corrosion resistance.

The present invention is intended to overcome the aforementioned limitations of the prior art by providing a gaseous fuel cell separator comprised of a generally flat, center portion having high electrical conductivity and a plurality of resilient, sealing flanges attached to the edges thereof which are highly corrosion existent and provide an effective fuel cell field. The present invention provides a low cost, easily fabricated and assembled fuel cell separator which is highly conductive in the electrically active portion of the fuel cell, while forming a gas-tight wet seal around the periphery of the fuel cell.

OBJECTS AND SUMMARY OF THE INVENTION

Accordingly, it is an object of the present invention to provide improved coupling between adjacent cells in a stacked gaseous fuel cell array.

It is another object of the present invention to provide an improved fuel cell separator for use between adjacent cells in a molten carbonate stacked fuel cell array.

Yet another object of the present invention is to provide a molten carbonate fuel cell separator with high conductivity and high resistance to corrosion.

A further object of the present invention is to provide a molten carbonate fuel cell separator having a gas-tight seal which is not formed by either welding or brazing.

A still further object of the present invention is to provide a fuel cell separator for sealing a molten carbonate fuel cell which reacts with the cell's electrolyte to form a gas-tight seal around the cell periphery.

Still another object of the present invention is to eliminate the need for temporary adhesive materials during the assembly and fabrication of a stacked array of molten carbonate cells. Another object of the present invention is to provide a fuel cell separator for use in a molten carbonate fuel cell capable of accommodating variations in the thickness of fuel cell components due to creep and thermal expansion while maintaining the cell in a sealed condition and ensuring good electrical contact between adjacent cells.

The present invention contemplates a fuel cell separator for use in a molten carbonate fuel cell stacked array. The separator is positioned between immediately adjacent fuel cells and provides a conductive path therebetween as well as maintaining each cell in a sealed condition. The fuel cell separator includes a generally flat, rectangular, conductive, inner portion preferably comprised of stainless steel with nickel cladding towards the anode. Around the edges of the inner flat portion of the separator are positioned a plurality of elongated, resilient flanges which securely engage a respective edge thereof. Each of the resilient flanges, which preferably are comprised of an alloy of either yttrium, iron, aluminum or chromium and thus are highly corrosion resistant, encapsulates a respective edge of the separator's inner flat portion and isolates the edge from the corrosive elements of the cell in forming a gas-tight seal.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
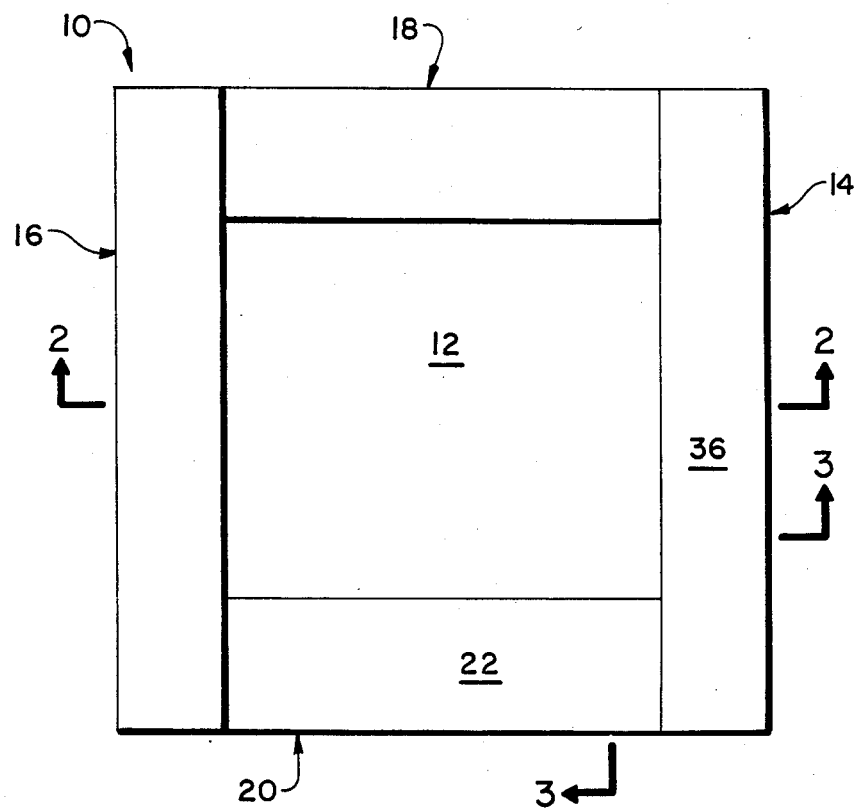
FIG. 1 is a top plan view of a fuel cell separator for a molten carbonate fuel cell in accordance with the present invention.
Figure 2:
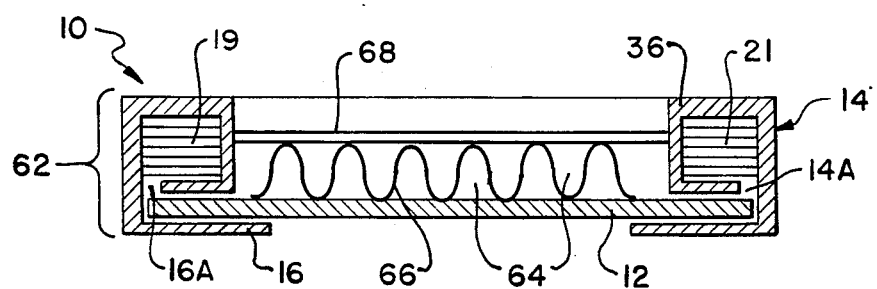
FIG. 2 is a cross sectional view of the fuel cell separator of FIG. 1 taken along sight line 2—2 therein.

Referring to FIG. 1, there is shown a top plan view of a fuel cell separator 10 for use in a molten carbonate fuel cell in accordance with the principles of the present invention. FIG. 2 is a cross sectional view of the fuel cell separator 10 of FIG. 1 taken along sight line 2—2 therein.

The fuel cell separator 10 includes a generally flat, rectangular metal plate 12. Referring specifically to FIG. 1 and with reference to the relative orientation of components shown therein, there are positioned around the edges of the metal plate 12 right and left sealing flanges, or clips, 14, 16 and upper and lower sealing flanges 18, 20. Although the latter two sealing flanges are referred to as "upper" and "lower" sealing flanges, they too are positioned on lateral edges of the plate 12.

As shown in the sectional view of FIG. 2, each of the right and left sealing flanges 14 and 16 is positioned on a respective lateral edge of the metal plate 12 which separates the fuel cell unit generally designated by the element 62 and another fuel cell unit (not shown) located immediately beneath the fuel cell unit 62 shown in the figure. In addition, yet another fuel cell unit (not shown) may be positioned immediately above the fuel cell unit 62 shown in the figure and would typically be provided with its own combination of a metal plate and peripheral sealing flanges for sealing the contents of the fuel cell within the various sealing flanges and between the immediately adjacent fuel cell separator plates. It is in this manner that a plurality of identical fuel cells may be arranged in a stacked array and electrically coupled by means of the conductive, flat metal plate portion of each fuel cell separator so as to form a gaseous fuel cell power system.

Each of the right and left sealing flanges 14, 16 is formed so as to define an elongated respective channel 14A, 16A extending the length thereof. Similarly, each of the right and left sealing flanges 14, 16 is comprised of a resilient material to permit a respective edge portion of the metal plate 12 to be inserted therein and engaged thereby. Positioned within each of the elongated channels 16A and 14A in the right and left sealing flanges 14, 16 are a plurality of laminated sheets 19, 21 as described in detail below.

The fuel cell unit 62 is comprised of various components with only the primary elements thereof described herein for simplicity. The fuel cell 62 includes a current collector positioned immediately adjacent to and in electrical contact with a catalyst layer 68. The current collector 66 is shaped in a manner so as to define a plurality of gas channels 64 through which a reactant gas is directed for interacting with the catalyst layer 68. Ionization of the reactant gas occurs as it diffuses into the catalyst layer 68 with the ions thus produced transferred from a cathode through an electrolyte (not shown) to an anode. The electrons generated in the aforementioned ionization process at the anode/electrolyte interface are transferred via an external circuit (not shown) in completing the reaction circuit. That portion of the fuel cell unit 62 shown in FIG. 2 may be either the anode or cathode portion thereof as the manner in which the fuel cell separator 10 interfaces with the electrodes of a molten carbonate fuel cell is not part of the present invention. Finally, while not shown in FIG. 2 and as described in detail below, the corresponding elongated channels containing laminated sheets of the upper and lower sealing flanges 18, 20 of FIG. 1 would be positioned generally beneath the plane of the metal plate 12 as shown in FIG. 2, although this is not depicted in the sectional view therein.

Figure 3:
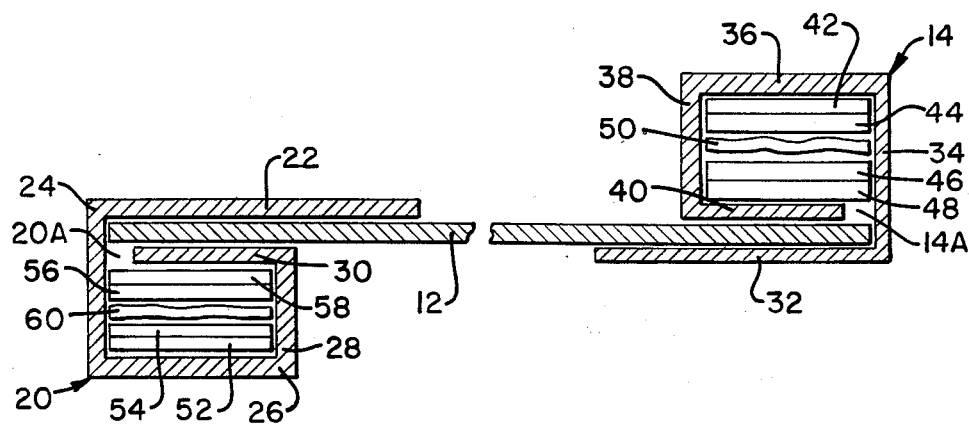
FIG. 3 is a sectional view of the fuel cell separator of FIG. 1 taken along sight line 3—3 therein.

Referring to FIG. 3, there is shown a sectional view of the fuel cell separator 10 of FIG. 1 taken along sight line 3—3 therein. Positioned on the right end, or edge, of the metal plate 12, which is sectioned in the figure, is the right sealing flange 14. Similarly, positioned on a lower edge of the metal plate 12 is the lower sealing flange 20. The left sealing flange 16 (not shown in FIG. 3) is positioned on a left edge of the metal plate 12 in facing relation to the right sealing flange 14 so as to form a mirror image thereof. Similarly, the upper sealing flange 18 is mounted to an upper edge of the metal plate 12 in a manner similar to that by which the lower sealing flange 20 is positioned on a lower edge of the metal plate 12 such that the upper and lower sealing flanges form mirror images of one another when thus positioned. Therefore, the configuration of and the manner in which each of the sealing flanges is positioned upon a respective edge of the metal plate 12 will be described in terms of the right sealing flange 14 and the lower sealing flange 20, with a similar description applicable to the left and upper sealing flanges 16 and 18.

The right sealing flange 14 is formed generally in the shape of the number "9" as shown in FIG. 3 and includes various coupled elongated members, all of which extend substantially the length of the metal plate 12. The right sealing flange 14 includes a first panel 32 coupled to and continuous with an outer panel 34 which, in turn, is coupled to and continuous with a second panel 36. The outer panel 34 forms angles with the first and second panels 32, 36 of generally 90°. An inner panel 38 couples a third panel 40 to the second panel 36 and forms angles of essentially 90° with the second and third panels. Thus, as shown in the figure, the first, second and third panels 32, 36 and 40 are aligned generally parallel, with narrow gaps located between the first and third panels 32, 40 as well as between the free end of the third panel 40 and the outer panel 34. In a preferred embodiment, the sealing flanges are comprised of a resilient, noncorrosive material such as an alloy of yttrium, aluminum, chromium or iron. In addition, each sealing flange is in the form of an integrated unit with the various panels thereof formed by conventional means such as stamping or extrusion. With the right sealing flange 14 resilient, the right edge of the metal plate 12 may be inserted within the gap between the first and third panels 32, 40 thereof and engaged thereby. In this manner, each of the sealing flanges is securely positoned upon a respective edge of the metal plate 12 and is thus maintained stably in position. For example, with increasing operating temperatures of the molten carbonate fuel cell, the metal plate 12 as well as the right sealing flange 14 will expand resulting in increased engagement between the sealing flange and the edge of the metal plate 12.

The cavity, or channel, 14A formed within the right sealing flange 14 and extending the length thereof is defined by the various coupled panels of the sealing flange. Positioned within the channel 14A are a plurality of laminated spring sheets 42, 44, 46, 48 and 50. Each of the spring sheets is generally in the form of an elongated, generally flat member and is preferably comprised of metal. In addition, the naturally occurring lack of flatness of the thus fabricated sheets, when placed in a stack as shown in FIG. 3, provides a laminate which requires some force to flatten it to the sum of the individual layer thicknesses. This provides the right sealing flange 14 with a resiliently compressible sealing arrangement wherein the resilience of the right sealing flange 14 as well as that of the various spring sheets positioned therein must be overcome in attaching the right sealing flange 14 to an edge of the metal plate 12. The combined nominal thicknesses of the second and third panels 36, 40 of the right sealing flange 14 in combination with the various laminated spring sheets 42, 44, 46, 48 and 50 positioned within the channel 14A thereof is substantially the same as the thickness of the components in the associated active region of the adjacent fuel cell unit 62. The sheets may be secured to each other and to the sealing flange 14 in a laminated structure by any suitable attachment means such as by gluing or spot welding.

Also shown in FIG. 3 is a sectional view of the lower sealing flange 20, the configuration of which is similar to that of the right sealing flange 14. Thus, the lower sealing flange 20 includes a first panel 22, an outer panel 24, a second panel 26, an inner panel 28, and a third panel 30, all of which are of a generally flat, elongated configuration and are coupled so as to form a cavity, or channel, 20A within and extending the length of the lower sealing flange 20. Positioned within the channel 20A of the lower sealing flange 20 are a plurality of laminated spring sheets 52, 54, 56, 58 and 60. As in the case of the right sealing flange 14, the resilience of the lower sealing flange 20 as well as the naturally occurring lack of flatness of the fabricated thin metal spring sheets 52, 54, 56, 58 and 60 requires the edge of the metal plate 12 to be inserted in the slot between the first and third panels 22, 30 of the lower sealing flange 20 by the application of force resulting in secure engagement between the lower sealing flange 20 and the respective edge of the metal plate 12.

In a typical molten carbonate fuel cell, each fuel cell separator 10 separates the cathode assembly of one fuel cell unit from the anode of an underlying adjacent fuel cell. Thus, if the electrode shown in FIG. 2 is a cathode, positioned immediately beneath the metal plate 12 would be the anode of any underlying adjacent fuel cell which is not shown in the figure for simplicity. Therefore, referring to FIGS. 1 and 3, the cathode of an upper fuel cell unit would be positioned between the right and left sealing flanges 14, 16, while the anode of an underlying adjacent fuel cell positioned immediately below the metal plate 12 would be positioned between the upper and lower sealing flanges 18, 20. The upper and lower sealing flanges of another fuel cell unit positioned immediately above the one shown in FIGS. 1, 2 and 3 would be used in combination with the right and left sealing flanges 14, 16 to completely enclose and seal the electrode elements shown in FIG. 2.

In a preferred embodiment, the metal plate 12 is comprised of a high conductivity material such as 316 stainless steel with a cladding of nickel or nickel alloy at a major surface for anode exposure. The edges of the metal plate 12 are protected from exposure to corrosion by means of the various sealing flanges positioned thereon. Each of the sealing flanges is preferably comprised of a material which is corrosion resistant to molten carbonate under cell operating conditions. Such materials as the alloys of yttrium, chromium, aluminum and iron offer the corrosion resistance required. These alloys are relatively poor conductors and typically form an aluminum oxide on the surface thereof when used in molten carbonate fuel cells in developing a corrosion resistant layer in the wet seal area of the gaseous fuel cell.

This aluminum oxide not only forms a protective layer over the alloy material of the sealing flange, but also seals gaps between the various panels of the sealing flange and the metal plate to provide a gas seal around the entire periphery of the metal plate 12 of the fuel cell separator 10. The aluminum oxide further reduces the conductivity of the alloy metal of the sealing flange.

The compressibility of the combination of a sealing flange and the laminated spring sheets positioned within the channel thereof serves to accommodate tolerances in the thickness of the associated electrode assemblies and other fuel cell components. Thus, the thicknesses of the various panels of the sealing flange and the various laminated spring sheets associated therewith can adjust as the electrodes shrink or creep and will resiliently spring back as required during temperature changes to accommodate thermal expansions of various fuel cell components. If the degree of compressibility of the laminated spring sheets positioned within a respective channel of a sealing flange is insufficient for a desired application, one or more of these spring sheets may be mechanically worked, such as shown for spring sheet 40 within the right sealing flange 14 and spring sheet 60 within the lower sealing flange 20, to increase its deviation from flatness. As shown in FIG. 2, this deviation from flatness is depicted as a plurality of corrugations or wave-forms within the spring sheets 50 and 60, but it will be appreciated that variations in the thickness of a spring sheet could be achieved by various approaches. For example, a spring sheet could be subjected to shot peening, vapor blasting or grit blasting to impart the desired irregularity in its flatness.

Figure 4:
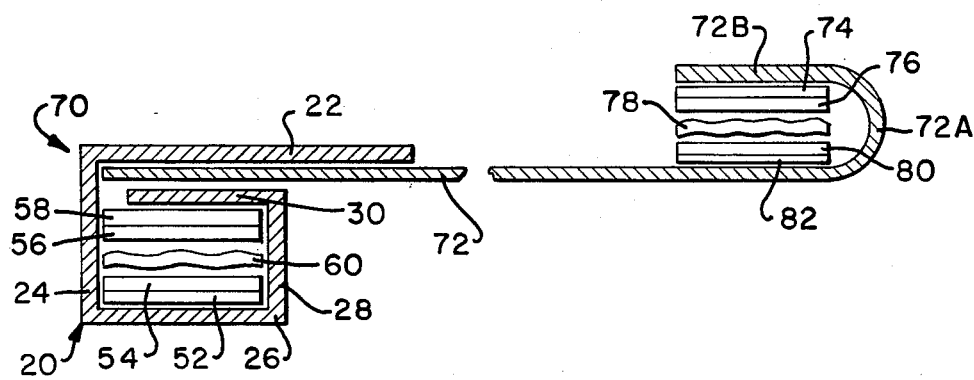
FIG. 4 is a sectional view similar to that of FIG. 3 showing a second embodiment of a fuel cell separator in accordance with the principles of the present invention.

Referring to FIG. 4, there is shown a fuel cell separator 70 in accordance with the present invention in combination with the molten carbonate fuel cell separator with compressible sealing flanges of the first patent application cross-referenced above. The fuel cell separator 70 includes a lower sealing flange 20 identical to that shown in and described with respect to FIG. 3. However, in the embodiment of FIG. 4 the fuel cell separator is provided with only two sealing flanges in accordance with the present invention. The end of the separator plate 72 opposite to that upon which the lower sealing flange 20 is securely mounted is provided with an arcuate end portion 72A as well as a flat portion 72B continuous and integral therewith. The flat portion 72B is generally parallel to and spaced from the main portion of the metal separator plate 72 and is coupled thereto by means of the arcuate end portion 72A. Positioned within the enclosure which extends the length of the metal plate 72 are a plurality of laminated spring sheets 74, 76, 78, 80 and 82. The various laminated spring sheets provide the right-hand portion of the seperater plate 72 with an expansion capability to compensate for high molten carbonate cell operating temperatures. In addition, one or more of these laminated spring sheets may be provided with a plurality of corrugations, as shown for the case of spring sheet 78 and as described earlier with respect to the right and lower sealing flanges 14, 20, in order to provide the right hand portion of the separator plate 72 with an increased degree of compressibility to provide adjustment as the electrodes shrink or creep while affording a resilient spring-back capability as required during temperature changes in compensating for thermal expansions of various fuel cell components. Although not shown in FIG. 4, one of the two remaining edges of the metal plate 72 would be provided with a similar arcuate end portion as shown on the right hand portion of FIG. 4, while the remaining edge would be provided with a sealing flange similar to the lower sealing flange 20 shown therein. This embodiment of the present invention is advantageous in that only two edges of the metal plate 72 must be formed in an arcuate shape rather than requiring all four edges thereof to be thus configured as described in the aforementioned cross-referenced patent application. The remaining two edges of the generally rectangular metal plate 72 would be provided with sealing flanges in accordance with the present invention in reducing fuel cell complexity and cost.

There has thus been shown a fuel cell separator for use in a stacked array of molten carbonate fuel cells which provides isolation as well as a conductive path therebetween. The fuel cell separator is comprised of a generally flat, rectangular metal conductor having a plurality of resiliently engaging, elongated, corrosion resistant sealing flanges securely attached to the edges thereof. The fuel cell separator thus provides high conductivity in the electrically active portion of the molten carbonate fuel cell while affording a corrosion resistant wet seal around the periphery thereof. In addition, the edges of the less corrosive resistant conductive material are protected from corrosion by the various sealing flanges without the welding or brazing of components and aluminum cladding of the corrosion subject portions of the fuel cell separator is eliminated.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A gaseous fuel cell for use in a stacked array of such gaseous cells, said gaseous fuel cell comprising:
   a first electrode adapted to allow a first gas to flow therethrough and having a first catalyst in contact therewith:
   a second electrode adapted to allow a second gas to flow therethrough and having a second catalyst in contact therewith;
   an electrolyte positioned between said first and second electrodes and in contact with said first and second catalysts;
   a substantially flat, planar plate positioned in contact with a respective catalyst of one of said electrodes and having a plurality of edges around the periphery thereof, said plate comprised of a first material having high electrical conductivity;
   a plurality of resilient sealing flanges positioned on and adapted to engage a respective edge of and to extend outward from the plane of said plate, said sealing flanges comprised of a second material having high corrosion resistance, wherein each sealing flange defines a channel and includes first and second facing members defining a slot therebetween within which a respective edge of said plate is inserted; and biasing means positioned within the channels defined by each of said sealing flanges for urging a first facing member toward a second facing member in maintaining each of said sealing flanges in tight fitting engagement with a respective edge of said plate in establishing a gas-impermeable seal therewith.

2. A gaseous fuel cell in accordance with claim 1 wherein said gaseous fuel cell is a molten carbonate fuel cell.

3. A gaseous fuel cell in accordance with claim 1 wherein said plate is generally rectangular and said gaseous fuel cell includes four sealing flanges each positioned on a respective edge of said plate.

4. A gaseous fuel cell in accordance with claim 3 wherein a first pair of sealing flanges each respectively disposed along a first pair of opposite facing edges of said plate extend therefrom on a first side of the plane thereof and wherein a second pair of sealing flanges each respectively disposed along a second pair of opposite facing edges of said plate extend therefrom on a second side of the plane thereof.

5. A gaeous fuel cell in accordance with claim 1 wherein said channel extends substantially the entire length of said sealing flange.

6. A gaseous fuel cell in accordance with claim 1 wherein said biasing means includes a resiliently compressible stack of sheets disposed in and substantially filling the channel of a sealing flange.

7. A gaseous fuel cell in accordance with claim 6 wherein said stack of sheets is secured to said sealing flange and adjacent ones of said sheets are secured together.

8. A gaseous fuel cell in accordance with claim 6 wherein at least one of said sheets includes additional resilient portions formed therein by mechanical working for increased stack resilience and enhanced engagement of a respective edge of said plate.

9. A gaseous fuel cell in accordance with claim 6 wherein said sheets are comprised of a thin sheet metal.

10. A gaseous fuel cell in accordance with claim 1 wherein said sealing flanges are comprised of a metal alloy from among the group of yttrium, chromium, aluminum and iron alloys.

11. A gaseous fuel cell in accordance with claim 10 wherein said gaseous fuel cell is a molten carbonate fuel cell and wherein an aluminum oxide forms on the surface of said metal alloy for increased sealing flange corrosion resistance and reduced sealing flange conductivity.

12. A gaseous fuel cell in accordance with claim 1 wherein said plate is comprised of stainless steel and includes nickel cladding on a major surface thereof.

* * * * *